Patented Apr. 11, 1944

2,346,296

UNITED STATES PATENT OFFICE 2,346,296

PREPARATION OF CALCIUM TITANATE

Helmut Espenschied, Metuchen, N. J., assignor to National Lead Company, New York, N. Y., a corporation of New Jersey No Drawing. Application October 24, 1941, Serial No. 416,374

7 Claims. (Cl. 106—299)

The present invention relates to a method of preparing calcium titanate having improved pigment properties.

It is known that by reaction between titanium dioxide and calcium oxide, or equivalent compounds of titanium and calcium, calcium titanate will be formed and its possible use as a pigment has been considered. However, like many other titanates, calcium titanate prepared by prior art methods was found to possess considerable photosensitivity, assuming a reddish discoloration on exposure to light. Furthermore, prior art calcium titanate was usually deficient in brightness and whiteness. The present invention contemplates a simple and expedient means for overcoming these disadvantages inherent in prior art calcium titanate.

Therefore, the principal object of the invention is to provide means for improving the pigmentary quality of calcium titanate. This, and other objects of the invention will become apparent from this description thereof.

According to the invention, calcium titanate is formed by thermal reaction between titanium dioxide, or a compound of titanium capable of yielding titanium dioxide on heating (hereafter referred to as "reactive titanium compound") and calcium oxide or a compound of calcium capable of yielding calcium oxide on heating (hereafter referred to as "reactive calcium compound"). This reaction mixture will contain, according to the invention, small amounts of certain reagents which favorably influence the properties of the calcium titanate formed.

The reagents contemplated by the invention include silica, $SiO_2$, an oxide of antimony, e. g., $Sb_2O_3$ or $Sb_2O_5$, and magnesia, $MgO$. It has been found that each of these agents favorably influences one or more properties of the calcium titanate but when all three are employed together they apparently exert a conjoint action producing a pigment having optimum properties. Thus, antimony oxide tends to reduce photosensitivity and enhance brightness. Silica alone has a beneficial effect on color; in combination with antimony oxide photosensitivity is overcome. Magnesia has a beneficial effect on color and brightness. The amount of antimony oxide to be used will vary between about 0.5 percent and about 3.0 percent, optimum about 2.0 percent; silica between about 0.5 percent and about 2.0 percent, optimum about 1.0 percent; magnesia between about 3.0 percent and about 7.0 percent, optimum about 5.0 percent, all percentages being based on the weight of the reaction mixture.

The "reactive titanium compounds" which are useful in practicing the invention will include titanium dioxide and other titanium compounds such as hydrous titanium dioxide which at the temperature of the thermal reaction yield titanium dioxide. The reactive titanium compounds should, of course, be free from discoloring impurities as well as those which tend to have a detrimental effect on brightness of the pigment. The "reactive calcium compounds" which are useful in practicing the invention will include calcium oxide and other calcium compounds such as calcium hydroxide which at the temperature of the thermal reaction yield calcium oxide. The reactive calcium compounds, like the titanium compounds should be free from discoloring impurities as well as those which tend to have a detrimental effect on brightness.

The reaction mixture of reactive titanium and calcium compounds including the added agents should be thoroughly mixed before heating. A thorough dry mixing will suffice but because of the ease by which a uniform and intimate mixture can be attained by means of a wet mixing, this latter procedure is to be preferred. Thus, the reactive titanium and calcium compounds together with the added agents can be slurried in water and the slurry ball milled until the desired degree of mixing is attained.

The temperature to be employed for the thermal reaction may vary between about 850° C. and 975° C. but for the attainment of optimum pigment properties a temperature of about 925° C is to be preferred. The duration of the heating will be such as to bring about as substantially complete combination of titanium dioxide and calcium oxide as possible. Any convenient means of heating may be employed, for example, a direct-fired rotary kiln or muffler furnace. It will generally be observed that, even when chemically equivalent quantities of titanium and calcium compounds are employed, the final product will contain some free calcium oxide. This should be eliminated if the calcium titanate is to be used in oleaginous vehicles to best advantage.

Titanium dioxide pigments, which in the course of their preparation are intimately associated with a small amount of antimony compound in order to inhibit chalking tendency, are known. Such pigments are good starting materials for practicing the present invention and when so used it is often not necessary to add more antimony compound.

The following examples illustrate, without limiting, the present invention:

Example I

In this example, the reaction mixture consisted of 412 grams of purified lime; 588 grams titanium dioxide pigment previously associated with 1 percent antimony trioxide; 20 grams antimony trioxide; 71.4 grams of colloidal silica paste containing 10 grams $SiO_2$, and 50 grams magnesia.

These constituents were wet milled in a ball mill for two hours, dewatered on a Buchner funnel, and dried. Subsequently, the dry mixture was calcined for three hours at about 925° C. in a stationary muffle furnace. After calcination, the product was washed with dilute sulfuric acid in order to remove unreacted lime and thereafter dried and pulverized. The tinting strength of the resulting material was 590 as obtained by the well-known Reynold's method. It had a good white color, high brightness and was free from photosensitivity.

Example II

Example I was repeated with the exception that the magnesia was omitted. The product so obtained, although free from photosensitivity, was somewhat less white than the product of Example I and did not possess the same high brightness.

The improved results of the present invention may be appreciated from the following table of light reflectances as obtained by the use of a Hunter multipurpose reflectometer as described in "Physical and Chemical Examination of Paints, Varnishes, Lacquers and Colors," ninth edition (139), page 41, by H. A. Gardner.

TABLE A

| Sample | Hunter dry brightness | | | |
|---|---|---|---|---|
| | Total | Red | Green | Blue |
| Blank | 88 | 91.1 | 86.0 | 85.8 |
| Example I | 96.6 | 97.0 | 96.2 | 95.8 |
| Example II | 93.7 | 95.0 | 91.8 | 90.4 |

The blank with which the products of Examples I and II were compared was calcium titanate prepared by heating substantially pure titanium dioxide with calcium oxide under the conditions described in Example I. As will be seen from Table A, it had a low total brightness, and possessed a distinct reddish tint and was photosensitive. The product of Example I which showed the highest brightness was prepared using silica, antimony oxide and magnesia and gave reflectance value very close together in the red, green and blue ranges and, as would be expected, was practically pure white. The product of Example II illustrates the effect of omission of magnesia. It had a high brightness but possessed a somewhat reddish tint. Both the products of Examples I and II were free from photosensitivity.

It will be seen from the foregoing that by means of the present invention it is possible to prepare calcium titanate pigments having high total brightness above 90 percent and having a blue reflectance valve not more than 5 percent below the red reflectance value.

I claim:
1. Method for preparing improved pigmentary calcium titanate which comprises forming a reaction mixture of a reactive titanium compound, a reactive calcium compound, between about 0.5 percent and about 2.0 percent of silica, between about 0.5 percent and about 3.0 percent of an oxide of antimony and between about 3.0 percent and about 7.0 percent of magnesia, all percentages being based on the weight of the reaction mixture, and heating said reaction mixture at temperatures between about 850° C. and about 975° C. until substantially complete formation of calcium titanate is attained.

2. Method for preparing improved pigmentary calcium titanate which comprises forming a reaction mixture of titanium dioxide, calcium oxide, about 1.0 percent of silica, about 2.0 percent of an oxide of antimony, and about 5.0 percent of magnesia, all percentages being based on the weight of the reaction mixture, and heating said reaction mixture at temperatures between about 850° C. and about 975° C. until substantially complete formation of calcium titanate is attained.

3. In a method of preparing improved pigmentary calcium titanate by thermal combination of a reactive titanium compound and a reactive calcium compound, the step which consists of heating at temperatures between about 850° C. and about 975° C. a reaction mixture of reactive titanium compound and reactive calcium compound containing between about 0.5 percent and about 2.0 percent of silica.

4. In a method of preparing improved pigmentary calcium titanate by thermal combination of a reactive titanium compound and a reactive calcium compound, the step which consists of heating at temperatures between about 850° C. and about 975° C. a reaction mixture of reactive titanium compound and reactive calcium compound containing between about 3.0 percent and about 7.0 percent of magnesia.

5. An improved pigmentary calcium titanate having high total brightness, being substantially pure white, free from photosensitivity and containing between about 0.5 percent and about 2.0 percent of silica, between about 0.5 percent and about 3.0 percent of an oxide of antimony and between about 3.0 percent and about 7.0 percent of magnesia.

6. An improved pigmentary calcium titanate having high total brightness, being substantially free from photosensitivity and containing in the amount specified a compound selected from the group consisting of about 0.5 percent and about 2.0 percent of silica, between about 0.5 percent and about 3.0 percent of an oxide of antimony and between about 3.0 percent and about 7.0 percent of magnesia.

7. An improved pigmentary calcium titanate having a total reflectance value of above 90 percent and a blue value reflectance not more than 5 percent below the red reflectance value and containing between about 0.5 percent and about 2.0 percent of silica, between about 0.5 percent and about 3.0 percent of an oxide of antimony and between about 3.0 percent and about 7.0 percent of magnesia.

HELMUT ESPENSCHIED.